US009600446B2

(12) United States Patent
Strzodka et al.

(10) Patent No.: US 9,600,446 B2
(45) Date of Patent: Mar. 21, 2017

(54) PARALLEL MULTICOLOR INCOMPLETE LU FACTORIZATION PRECONDITIONING PROCESSOR AND METHOD OF USE THEREOF

(71) Applicant: Nvidia Corporation, Santa Clara, CA (US)

(72) Inventors: Robert Strzodka, Zurich (DE); Julien Demouth, Courbevoie (FR); Patrice Castonguay, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 190 days.

(21) Appl. No.: 13/962,038

(22) Filed: Aug. 8, 2013

(65) Prior Publication Data

US 2015/0042672 A1 Feb. 12, 2015

(51) Int. Cl.
*G06F 17/16* (2006.01)
(52) U.S. Cl.
CPC .................................. *G06F 17/16* (2013.01)
(58) Field of Classification Search
None
See application file for complete search history.

(56) References Cited

U.S. PATENT DOCUMENTS

2014/0046993 A1* 2/2014 Castonguay ............ G06F 17/12
708/446

OTHER PUBLICATIONS

Maxim Naumov, Parallel Solution of Sparse Triangular Linear Systems in the Preconditioned Iterative Methods on the GPU, 2011, Nvidia Technical Report NVR-2011-001.*
FF Hernandez, JE Castillo, GA Larrazabal, Large Sparse Linear Systems Arising from Mimetic Discretization, 2007, Computers and Mathematics with Applications, 53:1-11.*
Michele Benzi, Preconditioning Techniques for Large Linear Systems: A Survey, 2002, Journal of Computational Physics, 182:418-477.*
Leonid Oliker, Xiaoye Li, Parry Husbands, Rupak Biswas, Effects of Ordering Strategies and Programming Paradigms on Sparse Matrix Computations, 2002, SIAM Review, 44(3):373-393.*
David Hysom, Alex Pothen, A Scalable Parallel Algorithm for Incomplete Factor Preconditioning, 2001, SIAM Journal of Scientific Computing, 22(6):2194-2215.*
Doruk Bozdag, Graph Coloring and Clustering Algorithms for Science and Engineering Applications, 2008, Doctoral Dissertation, The Ohio State University, Columbus, Ohio.*

(Continued)

*Primary Examiner* — Michael J Cobb
(74) *Attorney, Agent, or Firm* — Kevin Brown; Parker Justiss, P.C.

(57) ABSTRACT

A preconditioner processor and a method of computing a preconditioning matrix. In one embodiment, the preconditioner processor has parallel computing pipelines including: (1) a graph coloring circuit operable to identify parallelisms in a sparse linear system, (2) an incomplete lower triangle, upper triangle factorization (ILU) computer configured to employ the parallel computing pipelines according to the parallelisms to: (2a) determine a sparsity pattern for an ILU preconditioning matrix, and (2b) compute non-zero elements of the ILU preconditioning matrix according to the sparsity pattern, and (3) a memory communicably couplable to the parallel computing pipelines and configured to store the ILU preconditioning matrix.

16 Claims, 3 Drawing Sheets

(56) References Cited

OTHER PUBLICATIONS

Per Normann, Parallel Graph Coloring—Parallel Graph Coloring on Multi-Core CPUs, 2014, DIVA, pp. 1-45, ISSN: 1401-5757.*
G Karypis, V Kumar, Parallel Threshold-based ILU Factorization, 1997, ACM/IEEE 1997 Conference on Supercomputing, pp. 1-24, ISBN: 0-89791-985-8.*
Assefaw Hadish Gebremedhin, Fredrik Manne, Alex Pothen, What Color Is Your Jacobian? Graph Coloring for Computing Derivatives, 2005, SIAM Review, 47(4):629-705.*

* cited by examiner

US 9,600,446 B2

PARALLEL MULTICOLOR INCOMPLETE LU FACTORIZATION PRECONDITIONING PROCESSOR AND METHOD OF USE THEREOF

TECHNICAL FIELD

This application is directed, in general, to parallel processors and, more specifically, to using parallel processing for time- and memory-efficient factorization of an incomplete lower triangle, upper triangle (ILU) preconditioning matrix for solving sparse linear systems of equations into lower triangle and upper triangle (LU) matrices.

BACKGROUND

Assuming they can be effectively programmed, parallel processors such as graphics processing units (GPUs) have the potential to be remarkably adept at processing numerical algorithms, and particularly algorithms for directly solving large sparse linear systems.

Sparse linear systems are systems of linear equations with sparse coefficient matrices. These systems arise in the context of computational mechanics, geophysics, biology, circuit simulation and many other contexts in the fields of computational science and engineering. For example, a sparse linear system of nodes loosely coupled to each other would have few dependencies among the nodes. In certain contexts, direct solution methods for solving sparse linear systems exist and may be preferred for their robustness and predictable behavior. Iterative methods for solving sparse linear systems are gaining popularity as ever-larger sparse linear systems need solved and iterative solvers have become more efficient.

One common method of improving the efficiency of an iterative solver is to use a preconditioner to reduce the number of necessary iterations for reaching a prescribed error tolerance, as opposed to gaining efficiencies in the solver itself. Preconditioning is a way to transform the original linear system into another having the same solution, but is more amenable to an iterative solver. Popular preconditioners include stationary iterative methods such as Jacobi and Gauss-Seidel and incomplete factorization methods. Good preconditioners are ideally computationally cheap, reduce the number solver iterations and require little storage. Many institutions are funneling increasingly large amounts of resources into exploring iterative solvers and the application of preconditioners.

SUMMARY

One aspect provides a preconditioner processor having parallel computing pipelines, including: (1) a graph coloring circuit operable to identify parallelisms in a sparse linear system, (2) an ILU computer configured to employ the parallel computing pipelines according to the parallelisms to: (2a) determine a sparsity pattern for an ILU preconditioning matrix, and (2b) compute non-zero elements of the ILU preconditioning matrix according to the sparsity pattern, and (3) a memory communicably couplable to the parallel computing pipelines and configured to store the ILU preconditioning matrix.

Another aspect provides a method of computing a preconditioning matrix for solving a sparse linear system having vertices, including: (1) applying a graph coloring of certain distance to identify parallelisms among graph vertices, (2) parallel-processing the vertices according to the parallelisms to generate a sparsity pattern for an ILU preconditioning matrix, and (3) computing values of the ILU preconditioning matrix from the vertices according to the sparsity pattern.

Yet another aspect provides a finite element simulator, including: (1) an application configured to represent linearized properties of a material as a sparse linear system having a plurality of vertices and a sparsity factor, (2) a memory configured to store an ILU preconditioning matrix for solving the sparse linear system, and (3) a graphics processing unit (GPU) having parallel computing pipelines and operable to: (3a) apply a distance coloring to the plurality of vertices, and (3b) employ the parallel computing pipelines according to the distance coloring to: (3b1) compute a sparsity pattern for the ILU preconditioning matrix based on the sparsity factor, and (3b2) compute values for the ILU preconditioning matrix according to the sparsity pattern.

BRIEF DESCRIPTION

Reference is now made to the following descriptions taken in conjunction with the accompanying drawings, in which.

DETAILED DESCRIPTION

Figure 1:
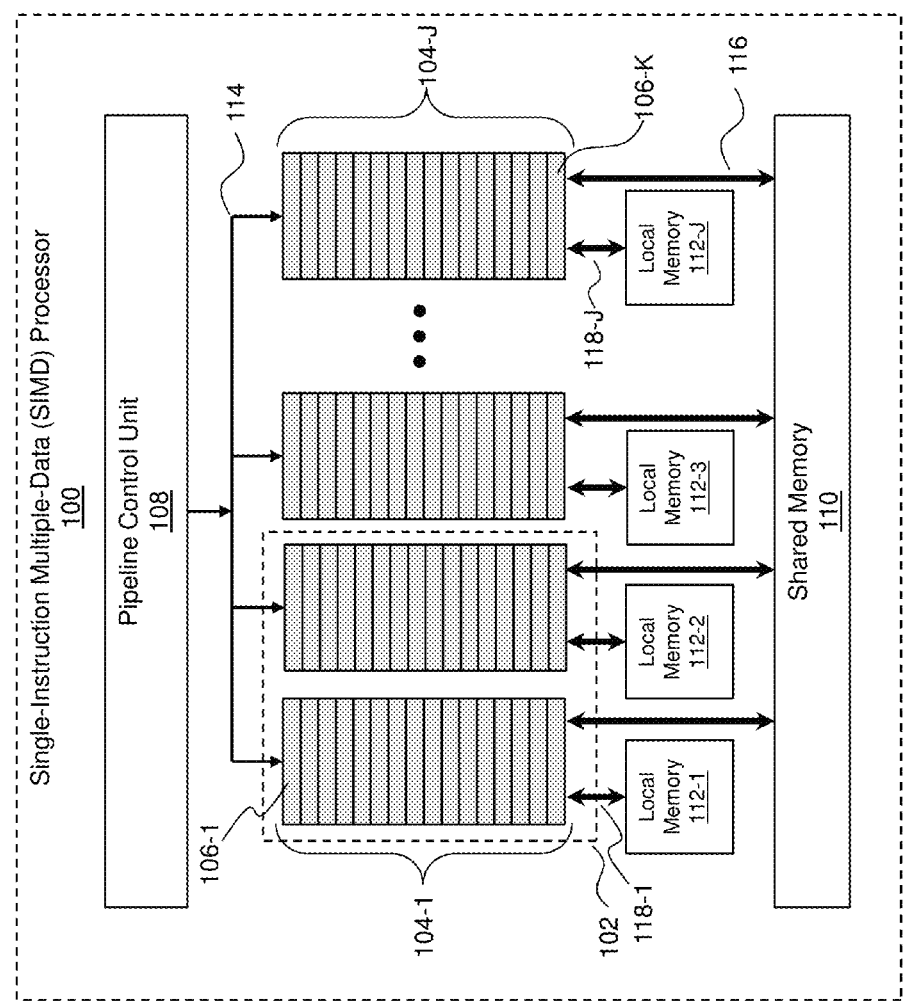
FIG. 1 is a block diagram of a SIMD processor within which parallel multicolor ILU preconditioning may be carried out.

Construction of effective and efficient preconditioners is largely problem dependent, most preconditioners being more or less successful for restricted classes of problems. Some of the more popular among these preconditioners are incomplete lower triangle, upper triangle factorizations (ILUs).

A common technique to solve a linear system, A, is LU-decomposition in which a coefficient matrix of the linear system is decomposed into the product of a lower triangular matrix, L, and an upper triangular matrix, U, a process called "factorization," such that A=LU. Then, conventional forward and backward substitution techniques can be used to solve the linear system with L and U triangular matrices and thereby obtain the solution of the linear system, A.

However, in sparse linear systems, the factors of A are often significantly less sparse than A, which makes solving computationally expensive. The idea of ILU preconditioning is to modify LU-decomposition to control the sparsity of the LU factors. To maintain the sparsity of A in the LU factors would generally not reduce the number of solver iterations, but is computationally cheap; while to relax from the sparsity of A (reduce sparsity) would reduce the number of solver iterations at the cost of computational complexity, and would require larger memory allocations to store the LU factors. An ILU preconditioner strikes a balance along those terms. So, rather than solve Ax=B, solve Mx=B, where M is an ILU preconditioning matrix, M=LU, and A=LU+R, where R is a remainder matrix. ILU factorization achieves this by allowing "fill-ins" at a restricted set of positions in the LU factors. Fill-ins are additional non-zero elements in the LU factors with respect to the original sparse linear system, A. To have no fill-ins is to maintain the sparsity of A, which is to say the LU factors have the same "sparsity pattern" as A. A sparsity pattern is simply the position of non-zero elements in a linear system, sometimes referred to as the "non-zero structure."

For example, in an ILU preconditioner, M=LU, with no fill-in, referred to as ILU(0), L is a sparse lower triangular matrix with the same non-zero structure as the lower part of A, and U is a sparse upper triangular matrix with the same non-zero structure as the upper part of A. Additionally, the entries of matrix M satisfy $m_{i,j}$ if $a_{i,j} \neq 0$, where $a_{i,j}$ is an element of A. Unfortunately, the strength of the ILU(0) factorization may be insufficient to yield an adequate rate of convergence for certain problems. ILU factorizations having a larger non-zero structure of L and U are often more efficient, such as an ILU(K) preconditioner, which allows $K^{th}$-order fill-in. For example, an ILU(1) preconditioner enlarges the non-zero structure by new elements ($1^{st}$-order elements) created during the factorization by existing elements of A ($0^{th}$-order elements). Elements that would be created by new elements ($2^{nd}$-order elements) are omitted and typically fall into the remainder matrix, R. An ILU(K) preconditioner may be referred to as having a fill-in level of K, or a "sparsity factor" of K.

Traditional techniques for computing the LU factors and to invert matrix M are inherently sequential and are therefore ill-suited for parallel hardware architectures, such as GPUs. Furthermore, it is realized herein, when a sparse linear system needs to be solved with low accuracy, which is often the case in linear solvers as part of non-linear solvers, such as a Newton solver, construction of the preconditioner represents a large fraction of the total execution time. It is realized herein a "distance coloring" can be applied to a sparse linear system to identify parallelisms that can be exploited by parallel hardware architectures. Graph coloring is defined herein as a process of assigning a color to each vertex in a graph such that no two connected vertices are assigned the same color. Distance coloring is defined herein as graph coloring based on distance, i.e. graph coloring in which no two graph vertices within a distance n of each other are assigned the same color. It is further realized herein these parallelisms can be leveraged in the construction of a multicolor ILU(K) preconditioner and, more specifically, the LU factors of the multicolor ILU(K) preconditioner.

It is realized herein that construction of a multicolor ILU(K) preconditioner for a sparse linear system, A, should include three stages: the first is to apply a distance coloring to A, the second is to compute a sparsity pattern using parallel processing based on the coloring, and the third is to compute the values of the multicolor ILU(K) preconditioner based on the computed sparsity pattern, also using parallel processing based on the coloring. It is also realized herein, in certain circumstances, sorting the computed sparsity pattern according to the coloring improves the computation time for computing multicolor ILU(K) preconditioner values.

Before describing the parallel multicolor ILU preconditioner processor and method in greater detail, a representative computing system within which the processor or method may be embodied or carried will be described.

FIG. 1 is a block diagram of a SIMD processor 100 operable to use parallel processing to compute a ILU preconditioning matrix. SIMD processor 100 includes multiple thread processors, or cores 106, organized into thread groups 104, or "warps." SIMD processor 100 contains J thread groups 104-1 through 104-J, each having K cores 106-1 through 106-K. In certain embodiments, thread groups 104-1 through 104-J may be further organized into one or more thread blocks 102. One specific embodiment has thirty-two cores 106 per thread group 104. Other embodiments may include as few as four cores in a thread group and as many as several tens of thousands. Certain embodiments organize cores 106 into a single thread group 104, while other embodiments may have hundreds or even thousands of thread groups 104. Alternate embodiments of SIMD processor 100 may organize cores 106 into thread groups 104 only, omitting the thread block organization level.

SIMD processor 100 further includes a pipeline control unit 108, shared memory 110 and an array of local memory 112-1 through 112-J associated with thread groups 104-1 through 104-J. Thread execution control unit 108 distributes tasks to the various thread groups 104-1 through 104-J over a data bus 114. Cores 106 within a thread group execute in parallel with each other. Thread groups 104-1 through 104-J communicate with shared memory 110 over a memory bus 116. Thread groups 104-1 through 104-J respectively communicate with local memory 112-1 through 112-J over local buses 118-1 through 118-J. For example, a thread group 104-J utilizes local memory 112-J by communicating over a local bus 118-J. Certain embodiments of SIMD processor 100 allocate a shared portion of shared memory 110 to each thread block 102 and allow access to shared portions of shared memory 110 by all thread groups 104 within a thread block 102. Certain embodiments include thread groups 104 that use only local memory 112. Many other embodiments include thread groups 104 that balance use of local memory 112 and shared memory 110.

Having described a representative computing system, various embodiments of the parallel multicolor ILU preconditioner processor and method, various embodiments of the preconditioner processor and method will be described in greater detail.

Figure 2:
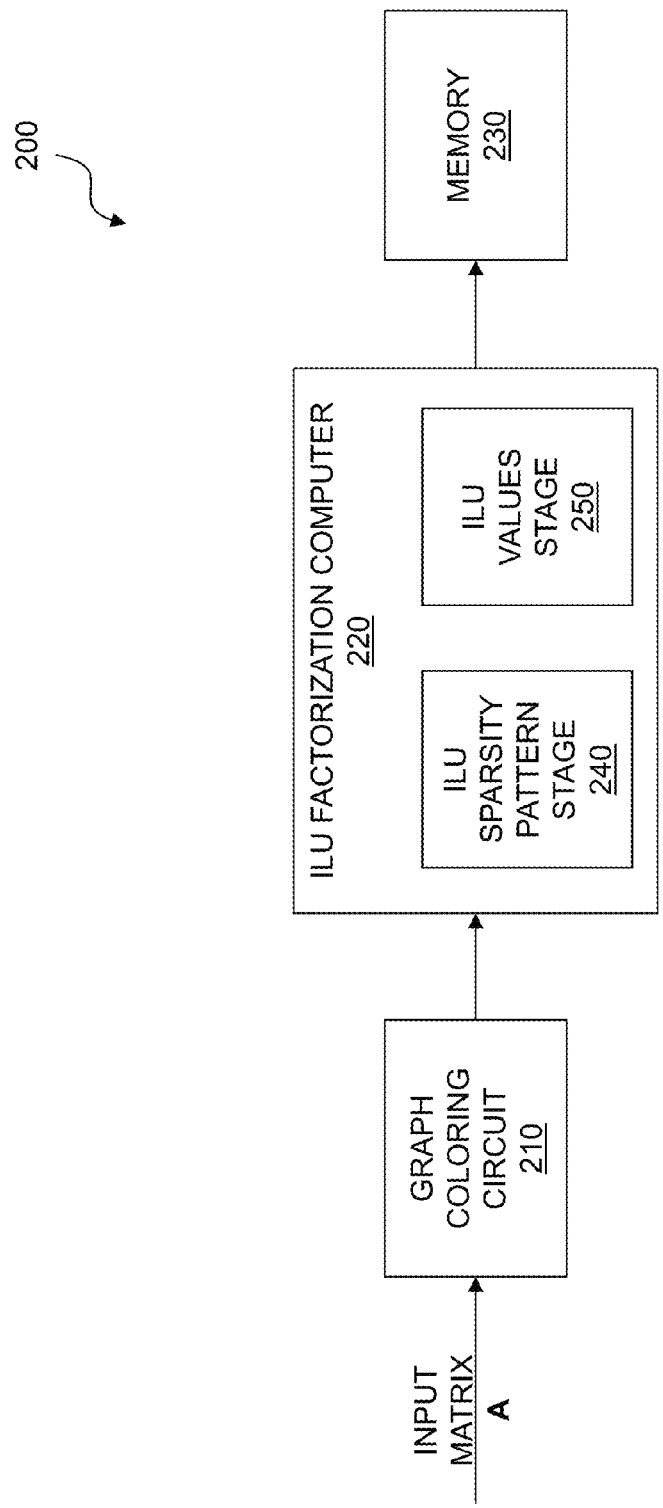
FIG. 2 is a block diagram of one embodiment of a preconditioner processor.

FIG. 2 is a block diagram of a preconditioner processor 200. Processor 200 includes a distance graph coloring circuit 210, an ILU factorization computer 220 and a memory 230. Processor 200 is operable to compute a multicolor ILU preconditioning matrix for a sparse linear system, A. Distance graph coloring circuit 210 identifies parallelisms in the sparse linear system. These parallelisms are leveraged by ILU factorization computer 220 to compute a sparsity pattern and values for the multicolor ILU preconditioning matrix. The multicolor ILU preconditioning matrix is then stored in memory 230.

Distance graph coloring circuit 210 operates on the original sparse linear system, A. The sparse linear system is treated such that each row of A is a vertex on a graph of A. For a given vertex on a path in the graph of A, each vertex on the path within a distance threshold, n, is distinctly colored with respect to the color of the given vertex. In other words, nearby vertices are distinctly colored. The distance threshold, n, is variable. In this embodiment, the distance threshold is K+1, where K is the fill-in level, or sparsity factor of the ILU preconditioning matrix. Alternate embodiments may use a K+2 or K+m fill-in level. Consequently, as the distance threshold, n, rises, so does the number of colors. For example, a distance coloring with n=K+1 would likely use fewer colors than one with n=K+3. One embodiment of a program for applying a distance {K+1} coloring is shown below in Table 1.

TABLE 1

Computation of distance{K+1} coloring of graph of A

```
// Compute local maxima in q-ring
//
// Input:        A: matrix
```

TABLE 1-continued

Computation of distance{K+1} coloring of graph of A

```
//              q: current ring
// Output:      m: maxima of hash( ) in q-ring of each vertex
//
general_coloring_step1(A, q, m) {
    forall i in {rows of A} {
        S_i= {uncolored indices of row A_i};
        if (q==1) {
            m_i= max { hash(j) | j in S_i};
        } else {
            m_i= max { m_j | j in S_i;
        }
    }//i
}
//
// Assign a color to all local maxima in {q+1}-rings
//
// Input:       A: matrix
//              c: color to be assigned
//              P: current coloring
//              m: maxima of hash( ) in q-ring of each vertex
// Output:      P: coloring including color c
//
general_coloring_step2(A, c, P, m) {
    forall i in {rows of A} {
        m2_i= max{ m_j | j in {uncolored indices of rowA_i}};
        if ( m2_i == hash(i) ) P(i)= c;
    }//i
}
//
// Create a valid coloring for matrix A
//
// Input:       A: matrix
//              K: ILU order with K>0
// Output:      P: coloring of A
//
general_coloring(A, K, P) {
    c= 0;
    while count_uncolored_rows(P) > 0 {
        for(q= 1; q<=K; q++) general_coloring_step1(A, q, m);
        general_coloring_step2(A, c, P, m);
        c++;
    }
}
```

ILU factorization computer 220 includes two stages, the first stage is an ILU sparsity pattern stage 240 and the second is an ILU values stage 250. In ILU sparsity pattern stage 240 and ILU values stage 250, ILU factorization computer 220 exploits parallelisms identified by distance graph coloring circuit 210 by operating on each like colored vertex independently (in parallel), and operating on each distinctly colored vertex sequentially. ILU sparsity pattern stage 240 carries out a symbolic computation to determine the non-zero structure of the LU factors of A. In the embodiment of FIG. 2, ILU sparsity pattern stage 240 computes an ILU(K) pattern for sparse linear system A having the coloring determined by distance graph coloring circuit 210. ILU sparsity pattern stage 240 achieves this in two passes: the first pass computes the number of non-zero elements for a given vertex, and the second pass computes the column locations of non-zero elements for the given vertex. One embodiment of a program for computing an ILU(K) pattern is shown below in Table 2.

TABLE 2

Computation of ILU(K) pattern for A

```
// Enlarge ILU(K) pattern by rows of color c
//
// Input:       A: sparsity pattern of matrix A
//              P: coloring of matrix A
```

TABLE 2-continued

Computation of ILU(K) pattern for A

```
//              c: current color
//              onlyRowLen: compute only row lengths?
//              C: ILU(K) sparsity pattern for colors smaller c
// Output:      C: if onlyRowLen then lengths of rows of color c
//                 else    ILU(K) sparsity pattern
//                 for colors smaller equal c
//
ILUK_pattern_step(A, P, C, c, onlyRowLen) {
    forall i in {rows of color c in A} {
        s = {column indices of row A_i};
        forall j in s {
            C_ij=A_ij;
            rank_ij= 0;
        }
        for d=0, . . . , c-1 {
            forall j in s {
                if( P(j) == d ) {
                    forall k in {column indices of row C_j} {
                        if( P(k) > P(j) && P(k) != c )
                            new_rank= rank_ij+rank_jk+1;
                            if( {k} in s ) {
                                rank_ik= min(rank_ik, new_rank);
                            } else if( new_rank <= K ) {
                                s= s union {k};
                                rank_ik= new_rank;
                            }
                        }
                    }//k
                }}//j
            }//d
            if(onlyRowLen)    C_i= #s; // size of row C_i;
            else              C_i= s; // column indices of row C_i;
    }//i
}
//
// Compute ILU(κ) pattern for matrix A with coloring P
// C= subset of pattern A^{K+1};
// All matrices refer to the column values
//
// Input:       A: sparsity pattern of matrix A
//              P: coloring of matrix A
// Output:      C: ILU(K) sparsity pattern
//
ILUκ_pattern (A, P, C) {
    for c=0, . . . , num_of_colors-1 {
        ILUκ_pattern_step(A, P, C, c, true); // row lengths
        Allocate computed row lengths of color c in C;
        ILUκ_pattern_step(A, P, C, c, false); // indices
    }//c
}
```

Although the fill-in level, K, is variable, in certain embodiments, efficiencies may be gained with specialized versions of ILU sparsity pattern stage 240 for specific values of K. For example, an embodiment configured to compute an ILU(1) preconditioning matrix could have an implementation similar to that of a sparse matrix-matrix product algorithm. One embodiment of such a program is shown below in Table 3.

TABLE 3

Computation of ILU(1) pattern for A

```
// Compute ILU1 pattern for matrix A with coloring P
// C= A1(A,P) .A2(A,P)
// All matrices refer to the column values
//
// Input:       A: sparsity pattern of matrix A
//              P: coloring of matrix A
//              onlyRowLen: compute only row lengths?
// Output:      C: if onlyRowLen then lengths of rows
//                 else    sparsity pattern
//
ILU1_pattern(A, P, C, onlyRowLen) {
    forall i in {rows of A} {
```

TABLE 3-continued

Computation of ILU(1) pattern for A

```
    s = {column indices of row A_i};
    if( P(i) > 0 ) {
      forall j in {column indices of row A_i} {
        if( P(j) < P(i) ) {
          forall k in {column indices of row A_j} {
            if( P(k) > P(j) && P(k) != P(i) ) {
              s= s union {k};
            }}//k
        }}//j
      }
      if(onlyRowLen)        C_i= #s; // size of row C_i;
      else                  C_i= s; // column indices of row C_i;
    }//i
  }
```

Once the sparsity pattern is computed, ILU value stage 250 computes the values of the ILU preconditioning matrix. Like colored vertices are processed in parallel and the fill-in level, κ, is assured by only computing values according to the sparsity pattern computed by ILU sparsity pattern stage 240. Conversely, certain existing methods compute patterns that overestimate the size of the non-zero structure of the ILU preconditioning matrix, which leads to the additional computation and storage of unnecessary coefficients in computing the LU factors. One embodiment of a program for computing ILU(κ) values is shown below in Table 4.

TABLE 4

Computation of ILU(K) values for A and ILU(K) sparsity pattern

```
// Compute ILU(K) factorization of values for matrix A with //
coloring P and ILU(K) pattern C
// A = L.U + R(A,P); L=(L'+I); U=(E+U' )
// The residual R(A,P) is not explicitly formed
// C stores (L', E⁻¹, U') in one matrix
// All matrices refer to the matrix values
//
// Input:       A: matrix A
//              P: coloring of matrix A
//              C: sparsity pattern of the result matrix C
// Output:      C= (L', E⁻¹, U') factorization of A
//
ILUκ_values (A, P, C) {
  forall (i,j) in {nonzeros of A} { C_ij= A_ij }
  for c=0, . . . , num_of_colors-1 {
    forall i in {rows of color c in C} {
      if( c > 0 ) {
        for j in {column indices of row C_i} {
          if( P(j) < c ) {
            F= C_ij.C_jj;
            C_ij= F;
            forall k in {column indices of row C_j} {
              if( P(k)>P(j) && k in {column indices of C_i} ) {
                C_ik-= F.C_jk;
              }}//k
          }}//j
        C_ii= C_ii⁻¹;
      }//i
    }//c
}
```

In certain embodiments, the vertices are sorted according to the coloring once the sparsity pattern is computed. Sorting improves the efficiency of the value computations in ILU value stage 250.

Once computed, ILU(K) is stored in memory 230. More specifically, the LU factors of ILU(K) are stored. The size of an allocation in memory 230 necessary to store the LU factors depends on the fill-in level. Because the LU factors of a sparse linear system are often less sparse than the original matrix, the ILU preconditioning matrix often requires more memory to store.

Figure 3:
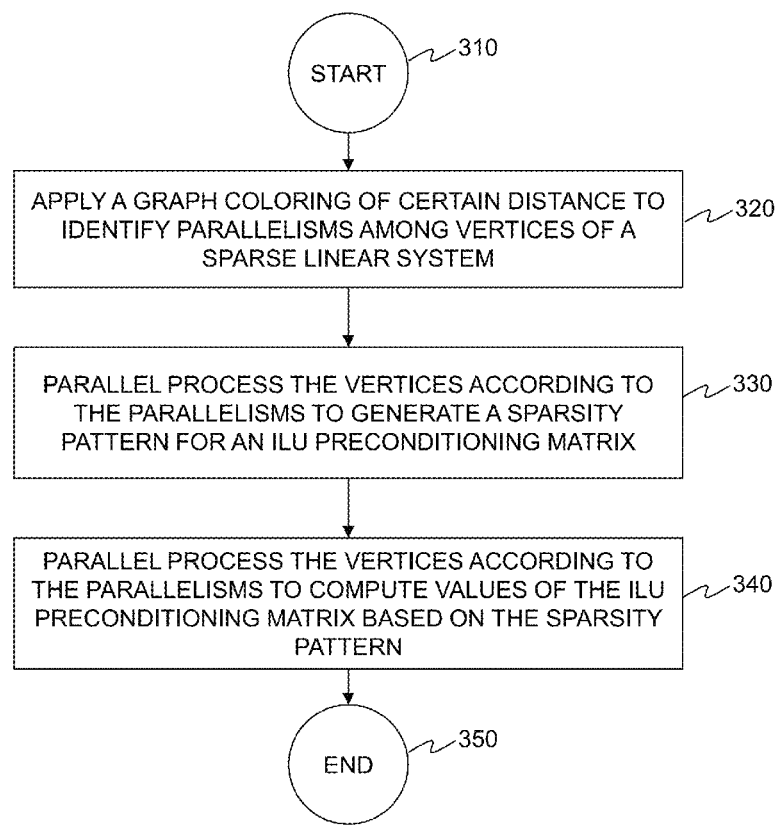
FIG. 3 is a flow diagram of one embodiment of a method for computing an ILU preconditioning matrix.

FIG. 3 is a flow diagram of a method of computing an ILU preconditioning matrix for a sparse linear system. The method begins in a start step 310. In a coloring step 320, a graph coloring of certain distance is applied to the original sparse linear system. The coloring identifies parallelisms among the vertices of the sparse linear system. In a sparsity pattern step 330, the parallelisms identified in coloring step 320 are exploited to parallel process the vertices of the original sparse linear system. Like colored vertices of the sparse linear system are processed in parallel to compute a sparsity pattern for the ILU preconditioning matrix. Distinctly colored vertices are processed sequentially to account for dependencies among neighboring vertices. For example, certain embodiments may compute an ILU(1) pattern, while another embodiment may compute an ILU(2) pattern. In an ILU values step 340 the parallelisms identified in coloring step 320 are exploited again. Like colored vertices are processed in parallel to compute the values of the ILU preconditioning matrix according to the sparsity pattern computed in sparsity pattern step 330. The method then ends in a step 350.

Those skilled in the art to which this application relates will appreciate that other and further additions, deletions, substitutions and modifications may be made to the described embodiments.

What is claimed is:

1. A preconditioner processor having parallel computing pipelines, comprising:
  a graph coloring circuit operable to identify parallelisms in a sparse linear system employing distance coloring;
  an incomplete lower triangle, upper triangle factorization (ILU) computer configured to employ said parallel computing pipelines according to said parallelisms to:
    determine a sparsity pattern for an ILU preconditioning matrix by parallel processing like-colored vertices of said sparse linear system;
    account for dependencies among neighboring vertices by sequentially processing distinctly-colored vertices of said sparse linear system; and
    compute values of non-zero elements of said ILU preconditioning matrix according to said sparsity pattern; and
  a memory communicably couplable to said parallel computing pipelines and configured to store said ILU preconditioning matrix.

2. The preconditioner processor recited in claim 1 wherein said graph coloring circuit is configured to apply said distance coloring having a distance threshold, wherein vertices of said sparse linear system within said distance threshold with respect to another vertex in said sparse linear system are distinctly colored.

3. The preconditioner processor recited in claim 2 wherein said distance threshold is a sparsity factor plus one, wherein said sparsity factor is indicative of the sparsity of said ILU preconditioning matrix with respect to the sparsity of said sparse linear system.

4. The preconditioner processor recited in claim 3 wherein said sparsity factor is one.

5. The preconditioner processor recited in claim 1 wherein said memory is configured to store said ILU preconditioning matrix as a lower triangle factor and an upper triangle factor.

6. A method of computing a preconditioning matrix for solving a sparse linear system having vertices, comprising:
  applying a distance threshold to identify parallelisms among said vertices by distance coloring;

coloring said vertices according to said parallelisms;
parallel-processing said vertices according to said parallelisms to generate a sparsity pattern for an incomplete lower triangle, upper triangle factorization (ILU) preconditioning matrix; and
computing values of said ILU preconditioning matrix from said vertices according to said sparsity pattern, wherein like-colored vertices of said vertices are paralleled processed to generate said sparsity pattern and distinctly-colored vertices are processed sequentially to account for dependencies among neighboring vertices of said vertices.

7. The method recited in claim 6 wherein said computing includes further parallel-processing said vertices according to said parallelisms, thereby generating a lower triangle, upper triangle (LU) factorization of said ILU preconditioning matrix.

8. The method recited in claim 6 wherein said ILU preconditioning matrix has a sparsity factor defined with respect to the sparsity of said sparse linear system.

9. The method recited in claim 8 wherein said distance threshold is said sparsity factor plus one.

10. The method recited in claim 6 wherein said parallel-processing includes:
generating a count of non-zero elements in a row of said ILU preconditioning matrix;
determining a column index for each of said non-zero elements; and
repeating said generating and said determining for each row of said ILU preconditioning matrix.

11. The method recited in claim 6 further comprising sorting said vertices according to said parallelisms, wherein said parallel-processing and said computing are carried out according to said sorting.

12. A finite element simulator, comprising:
a memory configured to store an incomplete lower triangle, upper triangle factorization (ILU) preconditioning matrix for solving a sparse linear system having a plurality of vertices and a sparsity factor, wherein said sparse linear system represents properties of a material; and
a graphics processing unit (GPU) having parallel computing pipelines and operable to:
apply a distance coloring to said plurality of vertices, and
employ said parallel computing pipelines according to said distance coloring to:
compute a sparsity pattern for said ILU preconditioning matrix based on said sparsity factor by parallel processing like-colored vertices of said plurality of vertices,
sequentially process distinctly-colored vertices of said plurality of vertices to account for dependencies among neighboring vertices, and
compute values for said ILU preconditioning matrix according to said sparsity pattern.

13. The finite element simulator recited in claim 12 wherein said ILU preconditioning matrix is less sparse than said sparse linear system.

14. The finite element simulator recited in claim 12 wherein said distance coloring is based on said sparsity factor.

15. The finite element simulator recited in claim 12 further comprising an iterative solver operable to employ said ILU preconditioning matrix to solve said sparse linear system.

16. The finite element simulator recited in claim 12 wherein said memory is configured to store said ILU preconditioning matrix as a lower triangle factor and an upper triangle factor.

* * * * *